US012437944B2

(12) United States Patent
Varrier et al.

(10) Patent No.: US 12,437,944 B2
(45) Date of Patent: Oct. 7, 2025

(54) HYBRID CIRCUIT BREAKER WITH A VACUUM INTERRUPTER

(71) Applicant: Eaton Intelligent Power Limited, Dublin (IE)

(72) Inventors: Mahesh Varrier, Perambra (IN); Tanmay Pralhad Tamboli, Hadapsar (IN); Matthias Katzensteiner, Vienna (AT)

(73) Assignee: Eaton Intelligent Power Limited, Dublin (IE)

( * ) Notice: Subject to any disclaimer, the term of this patent is extended or adjusted under 35 U.S.C. 154(b) by 155 days.

(21) Appl. No.: 18/559,507

(22) PCT Filed: May 6, 2022

(86) PCT No.: PCT/EP2022/025212
§ 371 (c)(1),
(2) Date: Nov. 7, 2023

(87) PCT Pub. No.: WO2022/238009
PCT Pub. Date: Nov. 17, 2022

(65) Prior Publication Data

US 2024/0258050 A1 Aug. 1, 2024

(30) Foreign Application Priority Data

May 11, 2021 (IN) ............................. 202111021278
Jun. 21, 2021 (GB) ..................................... 2108896

(51) Int. Cl.
*H01H 33/666* (2006.01)
*H01H 33/59* (2006.01)

(52) U.S. Cl.
CPC ........ *H01H 33/6661* (2013.01); *H01H 33/59* (2013.01)

(58) Field of Classification Search
CPC ...... H01H 9/542; H01H 33/59; H01H 33/666; H01H 33/6661; H01H 2009/543
(Continued)

(56) References Cited

U.S. PATENT DOCUMENTS 6,331,687 B1 * 12/2001 Dunk ................. H01H 11/0062 361/45
6,921,989 B2 * 7/2005 Baranowski ......... H01H 33/593 307/139
(Continued)

FOREIGN PATENT DOCUMENTS

GB 2375902 A * 11/2002 ............. H01H 9/542

OTHER PUBLICATIONS

Genji T, et al."400V Class High-Speed Currebt Limiting Circuit Breaker for Electricpower System", IEEE Transactions On Power Delivery, IEEE Service Center, New York, Ny, US, vol. 9, No. 3, Jul. 1, 1994 (Jul. 1, 1994), pp. 1428-1435, XP000484975, ISSN: 0885-8977, DOI: 10.1109/61.311172 p. 1429, paragraph 2.1-paragraph 2.2; figure 2.

*Primary Examiner* — Kevin J Comber
(74) *Attorney, Agent, or Firm* — LEYDIG, VOIT & MAYER, LTD.

(57) ABSTRACT

A hybrid circuit breaker is disclosed, which comprises an input connector for a power grid, an output connector for a load and a current path in-between. Furthermore, the hybrid circuit breaker comprises an electro-mechanical bypass switch being arranged in the current path and a semiconductor circuit in parallel with the electro-mechanical bypass switch. Further on, the hybrid circuit breaker comprises a control unit being capable of controlling a commutation from the current path, in which the electro-mechanical bypass switch is arranged, to the semiconductor circuit in case of a switch off operation. The electro-mechanical bypass switch is embodied as a vacuum interrupter, which
(Continued)

comprises a switching contact and an actuator being designed to drive the switching contact.

10 Claims, 3 Drawing Sheets

(58) Field of Classification Search
USPC .............................................................. 361/2
See application file for complete search history.

(56) References Cited

U.S. PATENT DOCUMENTS

| | | | | |
|---|---|---|---|---|
| 9,947,496 | B2 * | 4/2018 | Niehoff | H02H 3/025 |
| 2020/0343062 | A1 * | 10/2020 | Wu | H01H 33/18 |
| 2020/0411262 | A1 * | 12/2020 | Zhou | H01H 50/443 |

* cited by examiner

HYBRID CIRCUIT BREAKER WITH A VACUUM INTERRUPTER

PROBLEM OF THE INVENTION

The invention relates to a hybrid circuit breaker, which comprises an input connector prepared to be connected to a power grid, an output connector prepared to be connected to a load and a current path connecting the input connector and the output connector. Moreover, the hybrid circuit breaker comprises an electro-mechanical bypass switch being arranged in the current path and a semiconductor circuit in parallel with the electro-mechanical bypass switch. Finally, the hybrid circuit breaker comprises a control unit being capable of controlling a commutation from the current path, in which the electro-mechanical bypass switch is arranged, to the semiconductor circuit in case of a switch off operation of the hybrid circuit breaker.

BACKGROUND ART

A hybrid circuit breaker as defined above is generally known and disclosed in U.S. Pat. No. 9,947,496 B2 for example. When the electro-mechanical bypass switch is opened due to e.g. an overload condition at the output connectors (e.g. because of an arc fault or a short circuit in the load or in a circuit leading to the load), a current over the switching contacts of the electro-mechanical bypass switch is passed over or commutated to the semiconductor circuit. In detail, an arc voltage is generated between the contacts of the electro-mechanical bypass switch when they are opened causing the current commutation from the bypass switch to the semiconductor switch. After the current commutation, the current through the hybrid circuit breaker does not longer flow over the electro-mechanical bypass switch but flows over to the semiconductor circuit. By these measures, the deleterious effect of a switching arc across the switching contacts is reduced in time and thus has limited impact on the contacts. Accordingly, a hybrid circuit breaker combines the advantages of an electro-mechanical circuit breaker, which offers a very low on-state resistance but is prone to damages of the switching contacts due to massive arcing, and of a solid-state circuit breaker, which has no mechanical switching contacts but has a comparably high on-state resistance.

Generally, a drawback of a hybrid circuit breaker is that it gets bulky when it has to conduct larger nominal currents because the semiconductor circuit has to withstand very high over currents and fault currents then. Accordingly, it also has to absorb very high electric energy, which results in substantial electrical stress on the components of the hybrid circuit breaker, in particular on the semiconductor circuit. Moreover, the electric energy is converted to thermal energy in the semiconductor circuit, which has to be absorbed and dissipated. In common concepts, the semiconductor circuit is made so massive that it can withstand that high over and fault currents so that, as said, the hybrid circuit breaker gets bulky when it comes to high currents.

Cooling of the semiconductor circuit in principle is possible, too, but it is technically complicated and challenging. The reason is that the thermal energy is generated very fast, in other words the thermal power is very high, and cooling has to take place close to the junction of the semiconductor parts to be effective. Usually, the outer surface of common housings is not suitable for cooling because of the thermal resistance between the junction and the outer surface and because of the thermal capacitance of the housing. In other words, cooling through the outer surface is too slow.

It should also be noted that the above problems increase more than linearly with the nominal current because in addition to the increased current, the high-speed electro-mechanical bypass switch slows down. The reason is that the conductive and movable parts must be more massive to handle higher currents and are thus heavier. In turn, commutation of the current takes place later and takes longer due to the increased mass of the movable contacts of the electro-mechanical bypass switch. That is why the stress on the semiconductor circuit increases more than linearly with the nominal current.

In the above context it should be noted that the current does not immediately reach its top level when there is an arc fault or short circuit, but there is a steep current rise due to the grid's impedance. Because opening of the contacts to reach enough mechanical distance in order to establish the required dielectric strength takes some time, the semiconductor circuit conducts the worse part of the overload, i.e. the part with the higher currents. It is easy to understand that things become worse the longer it takes until current has commutated to the semiconductor circuit.

The very same problems also arise in view of other parts of the hybrid circuit breaker like in view of a varistor switched in parallel with the electro-mechanical bypass switch.

All in all, the advantage of a hybrid circuit breaker over electro-mechanical circuit breakers and solid-state circuit breakers decreases with increasing nominal currents, and there is a technical and economic limit for the use of hybrid circuit breakers.

DISCLOSURE OF INVENTION

Accordingly, a problem of the invention is to provide an improved hybrid circuit breaker. In particular, the size of and the costs for the semiconductor circuit of the hybrid circuit breaker shall be reduced, especially for high nominal currents. Particularly, the technical and economic limit for the use of hybrid circuit breakers shall be shifted to higher nominal currents without increasing the size and cost of the hybrid circuit breaker.

The problem of the invention is solved by a hybrid circuit breaker as defined in the opening paragraph, wherein the electro-mechanical bypass switch is embodied as a vacuum interrupter, which comprises a switching contact and an actuator being designed to drive the switching contact of the vacuum interrupter.

Because vacuum possess excellent dielectric strength, a stroke of approximately just 1 mm is required to achieve the required dielectric strength needed for the electro-mechanical bypass switch of the hybrid circuit breaker. Provided sufficient driving force, this contact distance can be reached very fast. Accordingly, the electric energy, which the semiconductor circuit has to absorb, is substantially lower than in common hybrid circuit breaker designs. That results in a reduction of the electrical stress on the components of the hybrid circuit breaker in general and in particular on the semiconductor circuit. By the above measures, the hybrid circuit breaker can withstand higher over currents in general and can be used for higher nominal currents without increasing the size of the semiconductor circuit. Moreover, the technical and economic limit for the use of hybrid circuit breakers is shifted to higher nominal currents. So, a larger range of electrical installations may benefit from the advantages of a hybrid circuit breaker.

It should be noted at this point that the hybrid circuit breaker of the proposed kind can be used in AC applications as well as in DC applications.

Further advantageous embodiments are disclosed in the claims and in the description as well as in the figures.

Advantageously, the actuator of the vacuum interrupter can be embodied as an electrodynamic actuator comprising a voice coil being movably arranged in a magnetic field. In particular, the electrodynamic actuator can comprise a permanent magnet with an iron core being designed to guide a magnetic field generated by the permanent magnet, wherein the voice coil is movably arranged in an air gap of the iron core and flown through by said magnetic field. An electrodynamic actuator can generate comparably high forces at low strokes and thus it advantageously can be used for the proposed hybrid circuit breaker. Because of the high driving forces, the switching contact of the vacuum interrupter opens very fast hence assisting to keep currents in the semiconductor circuit low. One should note in the above context that a "voice coil" may equally termed "moving coil" throughout the description.

In another advantageous embodiment, the hybrid circuit breaker comprises a first capacitor bank, which is electrically connected to the actuator of the vacuum interrupter in a switchable manner and which is designed to assist opening the switching contact of the vacuum interrupter when the first capacitor bank is switched to the actuator. In particular, the control unit can additionally be designed to switch the first capacitor bank to the actuator of the vacuum interrupter in a first polarity in case of a switch off operation. By use of the first capacitor bank, the switching contact of the vacuum interrupter can be opened even faster. This is particularly true if the actuator of the vacuum interrupter is embodied as an electrodynamic actuator. The first capacitor bank (in this first polarity) can be disconnected from the actuator of the vacuum interrupter again for example once the switching contact of the vacuum interrupter is opened or in case of a switch on operation.

Beneficially, the control unit can additionally be designed to switch the first capacitor bank to the actuator of the vacuum interrupter in a second opposite polarity in case of a switch on operation. In this way, the first capacitor bank can also be used for closing the switching contact of the vacuum interrupter very fast. This can also help to reduce contact degradation. The first capacitor bank (in this second polarity) can be disconnected from the actuator of the vacuum interrupter again for example once the switching contact of the vacuum interrupter is closed or in case of a switch off operation.

In another advantageous embodiment, the hybrid circuit breaker comprises a second capacitor bank, which is electrically connected to the actuator of the vacuum interrupter in a switchable manner and which is designed to assist closing the switching contact of the vacuum interrupter when the second capacitor bank is switched to the actuator. In particular, the control unit additionally can be designed to switch the second capacitor bank to the actuator of the vacuum interrupter (in a second opposite polarity) in case of a switch on operation. This is another possibility to assist closing the switching contact of the vacuum interrupter very fast. The second capacitor bank (in this second polarity) can be disconnected from the actuator of the vacuum interrupter again for example once the switching contact of the vacuum interrupter is closed or in case of a switch off operation.

Beneficially, the first capacitor bank and/or the second capacitor bank is part of the control unit. In this way, the number of parts for the hybrid circuit breaker can be reduced.

In another beneficial embodiment of the hybrid circuit breaker, the first capacitor bank has a higher capacity than the second capacitor bank. So, opening the switching contact of the vacuum interrupter does happen faster than closing the same. By these features, priority is laid on a fast opening of the switching contact of the vacuum interrupter so as to keep the overall size for the capacitor banks small.

In another advantageous embodiment, the switching contact of the vacuum interrupter is held in its closed or in its open position by means of a mechanical latch. So, no continuous electromagnetic force is needed to hold the switching contact of the vacuum interrupter in the closed or open position.

In another advantageous embodiment,

- the switching contact of the vacuum interrupter is held in its closed position by means of a spring and is designed to be opened by applying a current to the actuator or
- the switching contact of the vacuum interrupter is held in its open position by means of a spring and is designed to be closed by applying a current to the actuator. This is another embodiment where no continuous electromagnetic force is needed to hold the switching contact of the vacuum interrupter in the closed or open position.

In particular, a latch can be combined with a spring to obtain bistable behavior of the switching contact of the vacuum interrupter meaning that a driving force is just needed to change between the on-state and the off-state of the switching contact of the vacuum interrupter, but not to keep the on-state and the off-state.

Finally, it is advantageous if the hybrid circuit breaker additionally comprises a relay, which is switched in series with the vacuum interrupter and

- the control unit is additionally designed to open the relay after the vacuum interrupter has been opened.

In particular, by said relay all-pole breaking of the grid can be enabled if the vacuum interrupter has just a one-pole switching contact. Generally, a one-pole switching contact for the vacuum interrupter is of advantage because of the lower moving mass. However, nevertheless the vacuum interrupter can also have an all-pole switching contact. If so, no relay is needed for galvanic separation.

BRIEF DESCRIPTION OF DRAWINGS

The invention now is described in more detail hereinafter with reference to particular embodiments, which the invention however is not limited to.

DETAILED DESCRIPTION

Generally, same parts or similar parts are denoted with the same/similar names and reference signs. The features disclosed in the description apply to parts with the same/similar names respectively reference signs. Indicating the orientation and relative position is related to the associated figure, and indication of the orientation and/or relative position has to be amended in different figures accordingly as the case may be.

Figure 1:
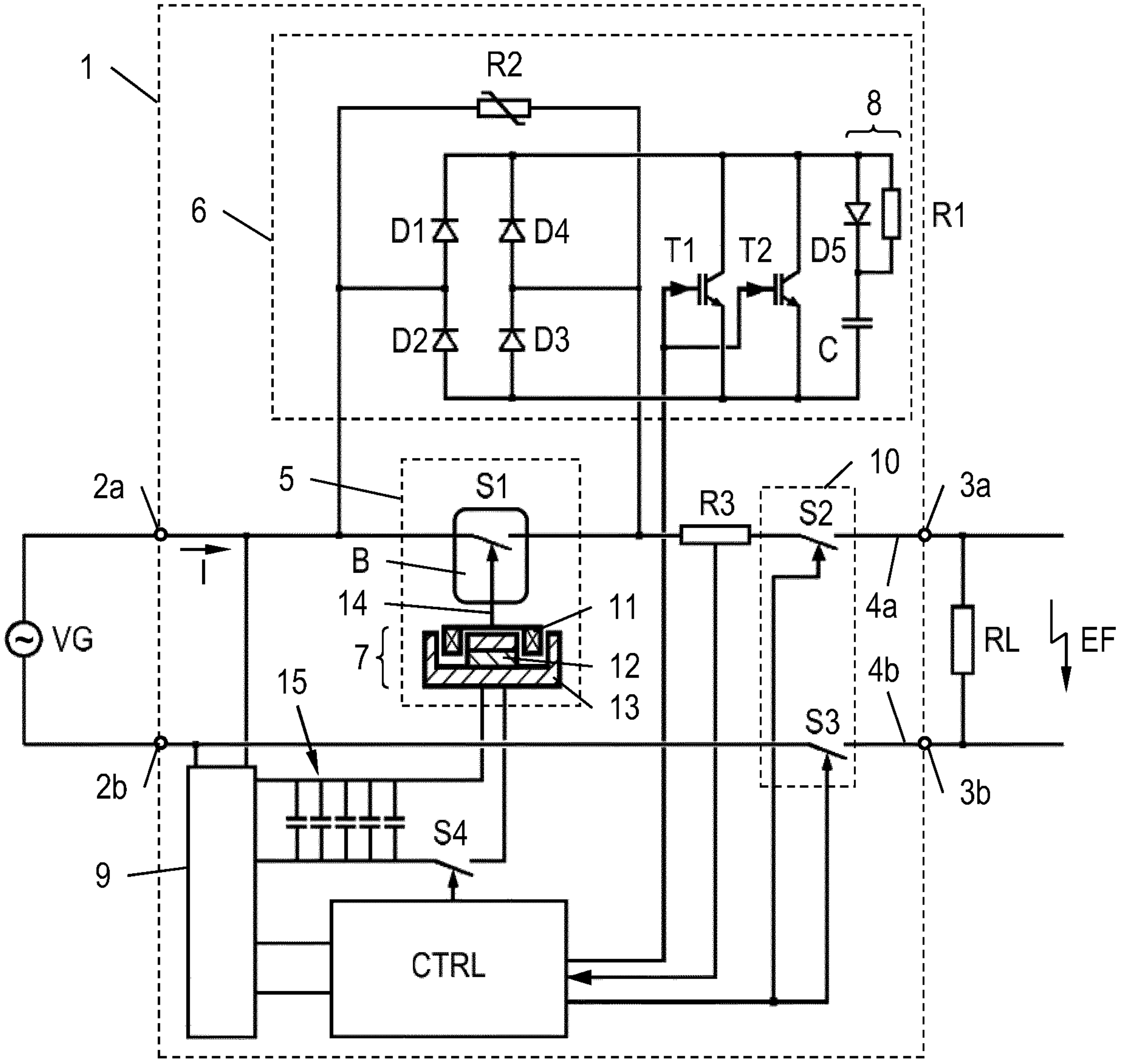
FIG. 1 shows a schematic of an exemplary hybrid circuit breaker.

FIG. 1 shows an exemplary hybrid circuit breaker 1, which comprises an input connector 2*a*, 2*b* for a power grid, an output connector 3*a*, 3*b* for a load RL and a current path 4*a*, 4*b* connecting the input connector 2*a*, 2*b* and the output connector 3*a*, 3*b*. Furthermore, the hybrid circuit breaker 1 comprises an electro-mechanical bypass switch 5 in the current path 4*a* and an exemplary semiconductor circuit 6 in parallel with the electro-mechanical bypass switch 5.

The electro-mechanical bypass switch 5 is embodied as a vacuum interrupter, which comprises a switching contact S1 being arranged in a vacuum chamber B and an actuator 7 being designed to drive the switching contact S1 of the vacuum interrupter 5.

Because vacuum possess excellent dielectric strength, a stroke for the switching contact S1 of the vacuum interrupter 5 of approximately just 1 mm is required to achieve the required dielectric strength needed for the electro-mechanical bypass switch 5 of the hybrid circuit breaker 1. Provided sufficient driving force, this contact distance can be reached very fast.

The semiconductor circuit 6 comprises a rectifier D1 . . . D4, the inputs of which are connected to the endpoints of the series connection of the electro-mechanical bypass switch 5. In this example, two parallel transistors T1, T2 (here in detail IGBTs) are switched between the outputs of the rectifier D1 . . . D4. However, a different number of transistors T1, T2 may be used instead. Furthermore, an optional snubber circuit 8 is arranged in parallel with the two transistors T1, T2. The snubber circuit 8 comprises a series connection of a snubber resistor R1 and a snubber capacitor C and a snubber diode D5 in parallel with the snubber resistor R1.

The hybrid circuit breaker 1 furthermore comprises a varistor R2, which is connected to the endpoints of the series connection of the electro-mechanical bypass switch 5 and forms an overvoltage protection for the same.

In addition, the hybrid circuit breaker 1 comprises a shunt R3, the terminals of which are connected to inputs of a control unit CTRL and which serves for measuring a current I flowing over the input connector 2*a*.

The control unit CTRL is not only for measuring the current I but is also being capable of controlling a commutation from the current path 4*a*, in which the electro-mechanical bypass switch 5 is arranged, to the semiconductor circuit 6 in case of a switching operation (e.g. in case of an over current through the electro-mechanical bypass switch 5). In particular, commutation can be initiated when the electro-mechanical bypass switch 5 is opened by the control unit CTRL and an arc voltage is generated. For this reason, the outputs of the control unit CTRL are connected to the input terminals of the electro-mechanical bypass switch 5 and to the transistors T1, T2.

The control unit CTRL is powered by a power unit 9, which is connected to the current path 4*a*, 4*b* and converts the voltage coming from the grid voltage source VG into a voltage which is suitable for the control unit CTRL.

Moreover, the hybrid circuit breaker 1 comprises an optional relay 10 with relay switching contacts S2, S3 in the current paths 4*a*, 4*b* providing a galvanic separation. Outputs of the control unit CTRL may be connected to the input terminals of the relay switching contacts S2, S3, too. In particular, by said relay 10 all-pole breaking of the grid can be enabled if the vacuum interrupter 5 has just a one-pole switching contact like this is shown in FIG. 1. Generally, a one-pole switching contact for the vacuum interrupter 5 is of advantage because of the lower moving mass. However, nevertheless the vacuum interrupter 5 can also have an all-pole switching contact. If so, no relay 10 is needed for galvanic separation.

FIG. 1 also shows a grid voltage source VG connected to the input connector 2*a*, 2*b* of the hybrid circuit breaker 1. At the output connector 2*a*, 2*b* there is connected a load RL and also shown an electrical fault EF, for example in the form of a short circuit or an arc flash.

The parts of the hybrid circuit breaker 1 preferably are arranged in a common housing. However, a modular design is possible as well.

In this example, the actuator 7 of the mechanical bypass switch 5 is embodied as an electrodynamic actuator comprising a voice coil 11 being movably arranged in a magnetic field. The electrodynamic actuator 7 may comprise a permanent magnet 12 with an iron core 13 being designed to guide a magnetic field generated by the permanent magnet 12 as this is depicted in the example of FIG. 1. The voice coil 11 is movably arranged in an air gap of the iron core 13 and flown through by said magnetic field. In detail, the voice coil 11 is connected to the switching contact S1 of the vacuum interrupter 5 by means of a rod 14. An electrodynamic actuator 7 can generate comparably high forces at low strokes and thus it advantageously can be used for the proposed hybrid circuit breaker 1. Because of the high driving forces, the switching contact S1 of the vacuum interrupter 5 opens very fast hence assisting to keep currents in the semiconductor circuit 6 low.

Moreover, an optional first capacitor bank 15 is electrically connected to the actuator 7 of the vacuum interrupter 5 in a switchable manner and assists opening the switching contact S1 of the vacuum interrupter 5 when the first capacitor bank 15 is switched to the actuator 7 (in this example to its voice coil 11). In more detail, the control unit CTRL is designed to switch the first capacitor bank 15 to the actuator 7 of the vacuum interrupter 5 in a first polarity in case of a switch off operation. The first capacitor bank 15 in this first polarity can be disconnected from the actuator 7 of the vacuum interrupter 5 again for example once the switching contact S1 of the vacuum interrupter 5 is opened or in case of a switch on operation. Switching the first capacitor bank 15 to and from the actuator 7 takes place by toggling the first bank switching contact S4. Additional measures could be useful to close the switching contact S1 of the vacuum interrupter 5 and/or to keep it open as this is depicted in FIGS. 2 to 6.

By use of the first capacitor bank 15, the switching contact S1 of the vacuum interrupter 5 can be opened even faster. This is particularly true if the actuator 7 of the vacuum interrupter 5 is embodied as an electrodynamic actuator like this is the case in FIG. 1.

The basic function of the hybrid circuit breaker 1 is as follows: If the current I, which is measured by use of the shunt R3, exceeds a current limit, the control unit CTRL switches the first capacitor bank 15 to the actuator 7 by use of the first bank switching contact S4 what in turn causes opening the switching contact S1 of the vacuum interrupter 5. In addition, the control unit CTRL also drives the transistors T1, T2 thus causing a current commutation from the vacuum interrupter 5 to the semiconductor circuit 6. Finally, the relay 10 is opened by the control unit CTRL providing galvanic separation. For switching on the hybrid circuit breaker 1, the control unit CTRL closes the relay 10 and switches off the transistors T1, T2. Then, the switching contact S1 of the vacuum interrupter 5 is closed. For this step, several options are possible, which are presented hereinafter by use of the FIGS. 2 to 6. It should also be noted at this point, that the first capacitor bank 15 and the relay 10 are optional. The actuator 7 can also be switched directly to the power unit 9 and a one-pole switch off can be considered as sufficient. Alternatively, the vacuum interrupter 5 can also have more than one switching contact S1.

Figure 2:
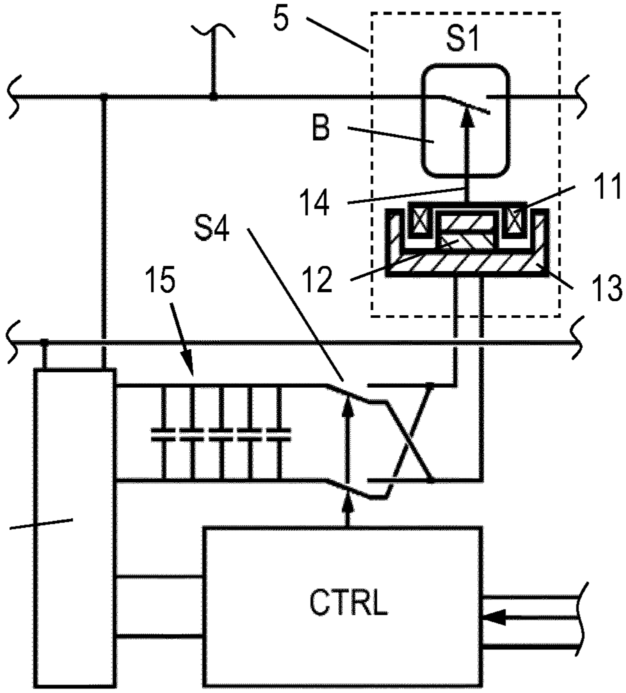
FIG. 2 shows a cutout of an alternative hybrid circuit breaker where the first capacitor bank can be switched to the actuator of the vacuum interrupter in two different polarities.

FIG. 2 shows a cutout of an alternative hybrid circuit breaker 1, which is different to that of FIG. 1. In this embodiment, the control unit CTRL is additionally designed to switch the first capacitor bank 15 to the actuator 7 of the vacuum interrupter 5 in a second opposite polarity in case of a switch on operation. For this reason, the first bank switching contact S4 is designed as a two-pole switch which reverses the polarity of the voltage, which is fed to the actuator 7 of the vacuum interrupter 5. In this way, the first capacitor bank 15 is not only used for opening the switching contact S1 of the vacuum interrupter 5 but can also be used for closing the switching contact S1 of the vacuum interrupter 5 very fast. This can also help to reduce contact degradation. It should also be noted that the first bank switching contact S4 can have a third switching state which provides galvanic separation between the first capacitor bank 15 and the actuator 7. So, the switching sequence could be S4=first polarity→S4=galvanic separation→S4=second polarity. Note that the first bank switching contact S4 has a natural but transient state of galvanic separation anyway because when the switching state changes from S4=first polarity to S4=second polarity the first bank switching contact S4 (quickly) moves through a zone of galvanic separation. Generally, the first capacitor bank 15 in the second polarity can be disconnected from the actuator 7 of the vacuum interrupter 5 again for example once the switching contact S1 of the vacuum interrupter 5 is closed or in case of a switch off operation.

Figure 3:
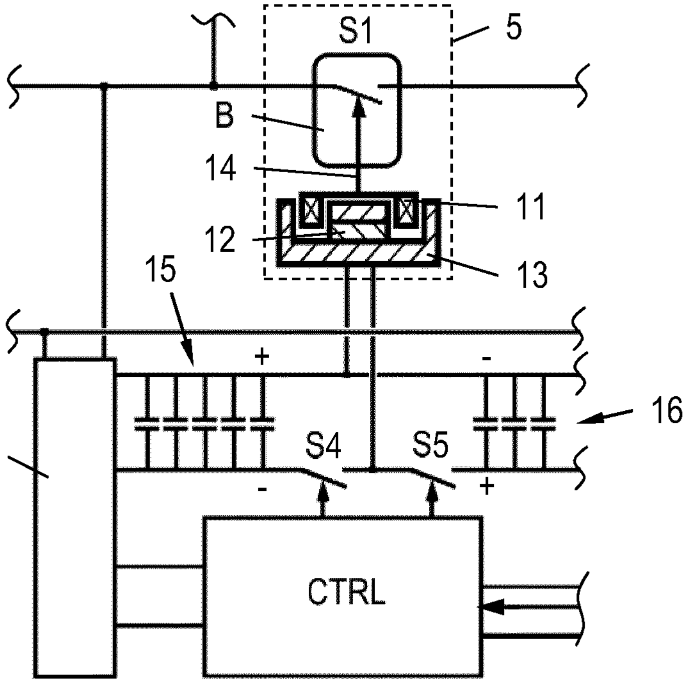
FIG. 3 shows a cutout of an alternative hybrid circuit breaker with a first and a second capacitor bank.

FIG. 3 shows a cutout of another alternative hybrid circuit breaker 1, which is different to that of FIG. 1. In detail, there is a second capacitor bank 16, which is electrically connected to the actuator 7 of the vacuum interrupter 5 in a switchable manner and which is designed to assist closing the switching contact S1 of the vacuum interrupter 5 when the second capacitor bank 16 is switched to the actuator 7. In more detail, the control unit CTRL is additionally designed to switch the second capacitor bank 16 to the actuator 7 of the vacuum interrupter 5 (in a second opposite polarity) in case of a switch on operation by use of the second bank switching contact S5. This is another possibility to assist closing the switching contact S1 of the vacuum interrupter 5 very fast. The second capacitor bank 16 in the second polarity can be disconnected from the actuator 7 of the vacuum interrupter 5 again for example once the switching contact S1 of the vacuum interrupter 5 is closed or in case of a switch off operation.

Figure 4:
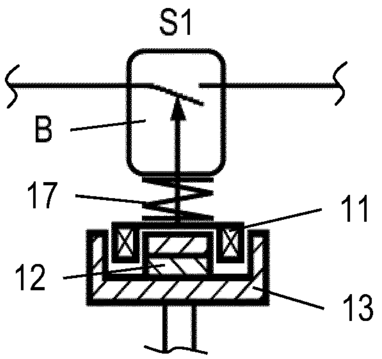
FIG. 4 shows a cutout of an alternative hybrid circuit breaker with a spring for opening the switching contact of the vacuum interrupter.
Figure 5:
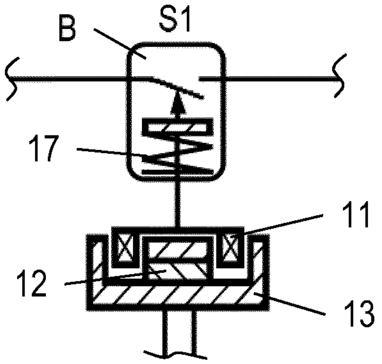
FIG. 5 shows a cutout of an alternative hybrid circuit breaker with a spring for closing the switching contact of the vacuum interrupter and FIG. 6 shows a cutout of an alternative hybrid circuit breaker with a latch for keeping the switching contact of the vacuum interrupter open.
Figure 6:
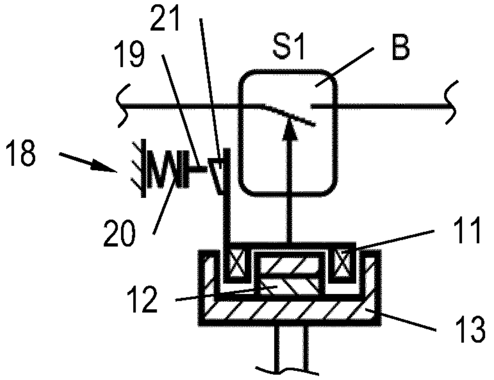

It is possible, to toggle the first bank switching contact S4 and the second bank switching contact S5 simultaneously but in opposite manner or to have an additional state where both the first bank switching contact S4 and the second bank switching contact S5 are open. In the first case, the control unit CTRL only changes between the states: S4=closed, S5=open, S1=open and S4=open, S5=closed, S1=closed. Here, in principle no further measures are needed to hold the switching contact S1 of the vacuum interrupter 5 in the closed state and open state. However, it is also possible to change states as follows: S4=closed, S5=open, S1=open→S4=open, S5=open, S1=open→S4=open, S5=closed, S1=closed→S4=open, S5=open, S1=closed. In this case, additional measures could be useful to keep the switching contact S1 of the vacuum interrupter 5 closed or open when both the first bank switching contact S4 and the second bank switching contact S5 are open. FIGS. 4 to 6 show examples how this can be achieved.

In FIGS. 1 to 3, the capacitor bank 15 and the second capacitor bank 16 are separate modules out of the control unit CTRL. However, the first capacitor bank 15 and/or the second capacitor bank 16 may also be part of the control unit CTRL. In this way, the number of parts for the hybrid circuit breaker 1 can be reduced.

In a preferred embodiment, the first capacitor bank 15 has a higher capacity than the second capacitor bank 16 like this is visualized in FIG. 3 by the higher number of capacitors in the first capacitor bank 15. By these features, priority is laid on a fast opening of the switching contact S1 of the vacuum interrupter 5 so as to keep the overall size for the capacitor banks 15, 16 small.

FIG. 4 shows another (smaller) cutout of an alternative hybrid circuit breaker 1, which is different to that of FIG. 1. In detail, the switching contact S1 of the vacuum interrupter 5 is held in its open position by means of a spring 17 and is designed to be closed by applying a current to the actuator 7. So, no continuous electromagnetic force is needed to hold the switching contact S1 of the vacuum interrupter 5 in the open position. This embodiment is particularly helpful in combination with an actuator 7, which only is designed to close the switching contact S1 of the vacuum interrupter 5.

FIG. 5 is quite similar to FIG. 4. In contrast, the switching contact S1 of the vacuum interrupter 5 is held in its closed position by means of a spring 17 and is designed to be opened by applying a current to the actuator 7. So, no continuous electromagnetic force is needed to hold the switching contact S1 of the vacuum interrupter 5 in the closed position. This embodiment is particularly helpful in combination with an actuator 7, which only is designed to open the switching contact S1 of the vacuum interrupter 5.

Finally, FIG. 6 shows a cutout of an alternative hybrid circuit breaker 1, which again is different to that of FIG. 1. In detail, the switching contact S1 of the vacuum interrupter 5 is held in its open position by means of a mechanical latch 18. The latch 18 comprises a pin 19 biased by a spring 20 and a pawl 21 connected to the voice coil 11. When the voice coil 11 moves down, the pin 19 locks the pawl 21 and thus the switching contact S1 of the vacuum interrupter 5. So, this is another embodiment where no continuous electromagnetic force is needed to hold the switching contact S1 of the vacuum interrupter 5 in the open position. Of course, some kind of unlocking mechanism is needed, which for the sake of brevity however is not shown in FIG. 6. It should be noted that the pawl 21 may also built in in the reverse direction so that the switching contact S1 of the vacuum interrupter 5 is latched in its closed position. This embodiment is particularly helpful in combination with an actuator 7, which shall not need to be activated all the time to hold the switching contact S1 of the vacuum interrupter 5 in its open or closed position.

It is noted that the invention is not limited to the embodiments disclosed hereinbefore, but combinations of the different variants are possible. In particular, the first capacitor bank 15 and the second capacitor bank 16, a spring 17 as well as a latch 18 can be combined in any desired manner. In particular, a latch 18 can be combined with a spring 17 to obtain bistable behavior of the switching contact S1 of the vacuum interrupter 5 meaning that a driving force is just needed to change between the on-state and the off-state of the switching contact S1 of the vacuum interrupter 5, but not to keep the on-state and the off-state.

In reality, the hybrid circuit breaker 1 may have more or less parts than shown in the figures. Moreover, the description may comprise subject matter of further independent inventions.

It should also be noted that the term "comprising" does not exclude other elements and the use of articles "a" or "an" does not exclude a plurality. Also elements described in association with different embodiments may be combined. It should also be noted that reference signs in the claims should not be construed as limiting the scope of the claims.

LIST OF REFERENCE NUMERALS

1 hybrid circuit breaker
2*a*, 2*b* input connector
3*a*, 3*b* output connector
4*a*, 4*b* current path
5 electro-mechanical bypass switch
6 semiconductor circuit
7 actuator
8 snubber circuit
9 power unit
10 relay
11 voice coil
12 permanent magnet
13 iron core
14 rod
15 first capacitor bank
16 second capacitor bank
17 spring
18 latch
19 pin
20 spring
21 pawl
B vacuum chamber
C snubber capacitor
CTRL control unit
D1 . . . D4 rectifier
D5 snubber diode
EF electric fault
I current
R1 snubber resistor
R2 varistor
R3 shunt
RL load
S1 switching contact of the vacuum interrupter
S2, S3 relay switching contacts
S4 first bank switching contact
S5 second bank switching contact
T1, T2 transistor (IGBT)
VG grid voltage source

The invention claimed is:

1. A hybrid circuit breaker, the hybrid circuit breaker comprising:
an input connector configured to be connected to a power grid;
an output connector configured to be connected to a load;
a current path connecting the input connector and the output connector;
an electro-mechanical bypass switch being arranged in the current path;
a semiconductor circuit in parallel with the electro-mechanical bypass switch; and
a control unit being configured to control a commutation from the current path, in which the electro-mechanical bypass switch is arranged, to the semiconductor circuit in case of a switch off operation,
wherein the electro-mechanical bypass switch is a vacuum interrupter, which comprises a switching contact and an actuator being configured to drive the switching contact of the vacuum interrupter,
wherein the hybrid circuit breaker further comprises a first capacitor bank, which is electrically connected to the actuator of the vacuum interrupter in a switchable manner and which is configured to assist opening the switching contact of the vacuum interrupter when the first capacitor bank is switched to the actuator,
wherein the control unit is additionally configured to switch the first capacitor bank to the actuator of the vacuum interrupter in a first polarity in case of a switch off operation, and
wherein the control unit is additionally configured to switch the first capacitor bank to the actuator of the vacuum interrupter in a second opposite polarity in case of a switch on operation.

2. The hybrid circuit breaker according to claim 1, wherein the actuator of the vacuum interrupter is an electrodynamic actuator comprising a voice coil being movably arranged in a magnetic field.

3. The hybrid circuit breaker according to claim 2, wherein the electrodynamic actuator comprises a permanent magnet with an iron core being configured to guide a magnetic field generated by the permanent magnet, and wherein the voice coil is movably arranged in an air gap of the iron core and flown through by the magnetic field.

4. The hybrid circuit breaker according to claim 1, the hybrid circuit breaker further comprising a second capacitor bank, which is electrically connected to the actuator of the vacuum interrupter in a switchable manner and which is configured to assist closing the switching contact of the vacuum interrupter when the second capacitor bank is switched to the actuator.

5. The hybrid circuit breaker according to claim 4, wherein the control unit is additionally configured to switch the second capacitor bank to the actuator of the vacuum interrupter in case of the switch on operation.

6. The hybrid circuit breaker according to claim 4, wherein the first capacitor bank has a higher capacity than the second capacitor bank.

7. The hybrid circuit breaker according to claim 1, wherein the first capacitor bank and/or the second capacitor bank is part of the control unit.

8. The hybrid circuit breaker according to claim 1, the hybrid circuit breaker further comprising a mechanical latch configured to hold the switching contact of the vacuum interrupter in its closed position or in its open position.

9. The hybrid circuit breaker according to claim 1,
wherein the hybrid circuit breaker further comprises a spring that is configured to hold the switching contact of the vacuum interrupter in its closed position, the switching contact being configured to be opened by applying a current to the actuator, or wherein the hybrid circuit breaker further comprises a spring that is configured to hold the switching contact of the vacuum interrupter in its open position, the switching contact configured to be closed by applying a current to the actuator.

10. The hybrid circuit breaker according to claim 1, wherein the hybrid circuit breaker additionally comprises a relay, which is switched in series with the vacuum interrupter and the control unit is additionally configured to open the relay after the vacuum interrupter has been opened.

* * * * *